United States Patent
Chen et al.

(10) Patent No.: US 12,321,392 B2
(45) Date of Patent: Jun. 3, 2025

(54) METHOD FOR BATCH CONFIGURATION OF LINKAGES, TERMINAL, SERVER, ELECTRONIC DEVICE, AND STORAGE MEDIUM

(71) Applicant: BYD COMPANY LIMITED, Guangdong (CN)

(72) Inventors: Yuetong Chen, Shenzhen (CN); Junxian Luo, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 0 days.

(21) Appl. No.: 18/392,553

(22) Filed: Dec. 21, 2023

(65) Prior Publication Data

US 2024/0143656 A1 May 2, 2024

Related U.S. Application Data

(63) Continuation of application No. PCT/CN2022/106804, filed on Jul. 20, 2022.

(51) Int. Cl.
*G06F 16/90* (2019.01)
*B61L 27/04* (2006.01)
*G06F 16/2455* (2019.01)
*G06F 16/901* (2019.01)

(52) U.S. Cl.
CPC .......... *G06F 16/9024* (2019.01); *B61L 27/04* (2013.01); *G06F 16/24565* (2019.01)

(58) Field of Classification Search
CPC .. G06F 16/9024; G06F 16/24565; G06F 8/41; B61L 27/04; G06Q 50/40
See application file for complete search history.

(56) References Cited

U.S. PATENT DOCUMENTS

| | | | |
|---|---|---|---|
| 2015/0051834 A1* | 2/2015 | Comi | B61L 27/10 |
| | | | 701/533 |
| 2017/0373933 A1 | 12/2017 | Subramanian et al. | |
| 2021/0065120 A1* | 3/2021 | De Munck | G06F 16/29 |

FOREIGN PATENT DOCUMENTS

| | | | |
|---|---|---|---|
| CN | 103795985 A | 5/2014 |
| CN | 104683443 A | 6/2015 |
| CN | 106940865 A | 7/2017 |
| CN | 112468527 A | 3/2021 |
| CN | 112758142 A | 5/2021 |

OTHER PUBLICATIONS

English translation of International Search Report from PCT International Application No. PCT/CN2022/106804 dated Oct. 12, 2022 (2 pages).

* cited by examiner

*Primary Examiner* — Etienne P Leroux
*Assistant Examiner* — Cindy Nguyen
(74) *Attorney, Agent, or Firm* — Calfee, Halter & Griswold LLP

(57) ABSTRACT

A method for batch configuration of linkages, a terminal, a server, an electronic device, and a storage medium are provided. The method for batch configuration of linkages includes the following steps. Data of linkage nodes configured in a linkage table and data of linkage nodes in an address space are loaded. Each of the linkage nodes configured in the linkage table includes a keyword representing a type of the linkage node. The data in the address space is retrieved based on the keywords representing the types of the linkage nodes. The data of the linkage nodes configured in the linkage table is loaded into all retrieved linkage nodes in batches.

20 Claims, 5 Drawing Sheets

METHOD FOR BATCH CONFIGURATION OF LINKAGES, TERMINAL, SERVER, ELECTRONIC DEVICE, AND STORAGE MEDIUM

CROSS-REFERENCE TO RELATED APPLICATIONS

The present disclosure is a bypass continuation application of PCT International Application No. PCT/CN2022/106804, filed on Jul. 20, 2022, which claims priority to Chinese Patent Application No. 202110874713.0, filed on Jul. 30, 2021, and entitled "METHOD FOR BATCH CONFIGURATION OF LINKAGES, TERMINAL, SERVER, ELECTRONIC DEVICE, AND STORAGE MEDIUM". The entire contents of the above-referenced applications are incorporated herein by reference.

FIELD

The present disclosure relates to the technical field of rail transit, and more specifically, to a method for batch configuration of linkages, a terminal, a server, an electronic device, and a storage medium.

BACKGROUND

A comprehensive operation dispatching system is mainly applied to the field of rail transit, and is an open, modularized, and scalable distributed large-scale computer integration system. The platform is integrated with subsystems such as vehicle control, power management, fire alarm, and building device automation, and monitors and controls the subsystems. Since dispersed distribution of the subsystems does not facilitate coordinated control, the comprehensive operation dispatching system is generally integrated with a corresponding linkage apparatus, to facilitate coordinated control of the subsystems, thereby coping with some comprehensive events such as a sudden large passenger flow, a fire, and a platform door failure.

Generally, linkage functions provided by the comprehensive operation dispatching system include a predefined linkage. The predefined linkage is a linkage function predefined based on a linkage scenario. An operator is not allowed to modify definitions and settings of the linkage online. In an actual line, the predefined linkage has a relatively large amount of data. In a line, thousands of predefined linkage scenarios may need to be defined, and many pieces of information needs to be configured in each of the linkage scenarios. Each piece of the information is located on a different page. In the related art, each single point of the information may only be configured one by one in a data configuration tool. However, each single point is distributed on a different page and at a different position on the same page, which brings a huge workload to a data processing person, and impedes subsequent maintenance and management.

SUMMARY

In view of the above problem, embodiments of the present disclosure are provided, to provide a method for batch configuration of linkages, a terminal, a server, an electronic device, and a storage medium that overcome or partially resolve the above problem.

In order to resolve the above problem, in a first aspect, an embodiment of the present disclosure discloses a method for batch configuration of linkages, which is applicable to a linkage configuration process in the field of rail transit. The method includes the following steps.

Data of linkage nodes configured in a linkage table and data of linkage nodes in an address space are loaded. Each of the linkage nodes configured in the linkage table includes a keyword representing a type of the linkage node.

The data in the address space is retrieved based on the keywords representing the types of the linkage nodes. The data of the linkage nodes is loaded into all retrieved linkage nodes in batches.

Optionally, the data of the linkage node includes basic linkage data and linkage action data. The basic linkage data includes a linkage attribute, a triggering factor, and a to-be-performed linkage action. The linkage action data includes an action script and an action attribute.

The linkage attribute includes relevant information of the linkage node. The triggering factor is configured for triggering the linkage action. The to-be-performed linkage action corresponds to the linkage action data. The action script is configured for executing the linkage action. The action attribute includes relevant information of the linkage action.

Optionally, the linkage table includes linkage triggering tables and linkage action tables. Each linkage node corresponds to one of the linkage triggering tables. One linkage triggering table corresponds to multiple linkage action tables.

The linkage triggering table includes a linkage name, a linkage instance name, a linkage triggering condition, a linkage category, and an execution manner. Each of the linkage action tables includes an action name, an action specialty, and a corresponding action script.

Optionally, before the data of the linkage nodes configured in the linkage table is loaded, the method further includes the following steps.

A configured linkage instance is reset.

Available linkage nodes are obtained from the address space.

The linkage nodes are obtained from the linkage table.

The linkage nodes obtained from the linkage table are compared with the linkage nodes in the address space. Linkage nodes that do not exist in the address space are deleted. Linkage nodes that exist in the address space are obtained.

Optionally, after the data of the linkage nodes is loaded into all retrieved linkage nodes in batches, the method further includes the following step.

A linkage is registered with a trigger manager.

In a second aspect, an embodiment of the present disclosure further discloses a method for batch configuration of linkages, which is applicable to a linkage configuration process in the field of rail transit. The method includes the following steps.

An editing operation performed by a user on a linkage table is received. The editing operation on the linkage table includes creating the linkage table, modifying the linkage table, and configuring linkage nodes and data in the linkage nodes in the linkage table.

Data generated during the editing operation is transmitted to a linkage server.

The linkage table and information about a linkage instance corresponding to the linkage table are displayed.

The linkage data in the linkage table is compiled and loaded into an address space of a comprehensive operation dispatching system.

Optionally, after the linkage data in the linkage table is compiled and loaded into the address space of the comprehensive operation dispatching system, a linkage plug-in is loaded when a real-time database in the comprehensive operation dispatching system is enabled. The linkage plug-in is initialized upon being loaded.

In a third aspect, an embodiment of the present disclosure further discloses a terminal device, which includes a first sending apparatus, a first receiving apparatus, a second receiving apparatus, and a data processing apparatus.

The first sending apparatus is configured to send configured linkage nodes and data in the linkage nodes to an address space.

The first receiving apparatus is configured to receive linkage data in a data configuration terminal.

The second receiving apparatus is configured to receive data of linkage nodes in the address space.

The data processing apparatus is configured to: retrieve the data in the address space based on a keyword in each of the linkage nodes representing a type of the linkage node, and load the data of the linkage nodes into all retrieved linkage nodes in batches.

An implementation of the present disclosure further provides a terminal device, which includes a display apparatus, a first sending apparatus, a data processing apparatus, a second sending apparatus, and a data editing apparatus.

The display apparatus is configured to display a linkage instance node and a linkage table.

The first sending apparatus is configured to send linkage nodes in the linkage table and data in the linkage nodes to a linkage server.

The data processing apparatus is configured to compile the data of the linkage nodes in the linkage table.

The second sending apparatus is configured to send compiled data of the linkage nodes to an address space.

The data editing apparatus is configured to receive an editing operation performed by a user on the linkage table. The editing operation on the linkage table includes creating the linkage table, modifying the linkage table, and configuring the linkage nodes and the data in the linkage nodes in the linkage table.

In a fourth aspect, an embodiment of the present disclosure provides a system for batch configuration of linkages, which includes a linkage server and a data configuration terminal.

The linkage server is applicable to a comprehensive operation dispatching system in the field of rail transit, and is configured to: load data of linkage nodes configured in a linkage table and data of linkage nodes in an address space, retrieve the data in the address space based on a keyword in the linkage node representing a type of each of the linkage nodes, load the data of the linkage nodes into all retrieved linkage nodes in batches, and register a linkage with a trigger manager, the trigger manager being included in the linkage server.

The data configuration terminal is applicable to a linkage configuration process in the field of rail transit, and is configured to: receive an operation performed by a user on the linkage table, display the linkage data, and send the linkage data to the linkage server.

In a fifth aspect, an embodiment of the present disclosure further discloses an electronic device, which includes at least one processor and a memory.

The memory is communicably connected to the at least one processor. The memory stores instructions executable by the at least one processor. The instructions, when executed by the at least one processor, cause the at least one processor to perform the above method for batch configuration of linkages.

In a sixth aspect, an embodiment of the present disclosure further discloses a computer-readable storage medium, which stores a computer program. The computer program, when executed by a processor, implements the above method for batch configuration of linkages.

The embodiments of the present disclosure include the following advantages:

BRIEF DESCRIPTION OF THE DRAWINGS

In order to describe the technical solutions in embodiments of the present disclosure or in the related art more clearly, drawings required for describing the embodiments or the related art are briefly described below. Apparently, the drawings in the following description show only some embodiments of the present disclosure, and a person of ordinary skill in the art may still derive other drawings from the drawings without making creative efforts.

DETAILED DESCRIPTION

Embodiments of the present disclosure are described in detail below. The technical solutions in the embodiments of the present disclosure are described clearly and completely below with reference to drawings in the embodiments of the present disclosure. Apparently, the described embodiments are merely some rather than all of the embodiments of the present disclosure. All other embodiments obtained by a person of ordinary skill in the art based on the embodiments described in present disclosure without making creative efforts fall within the protection scope of the technical solutions of the present disclosure.

Figure 3:
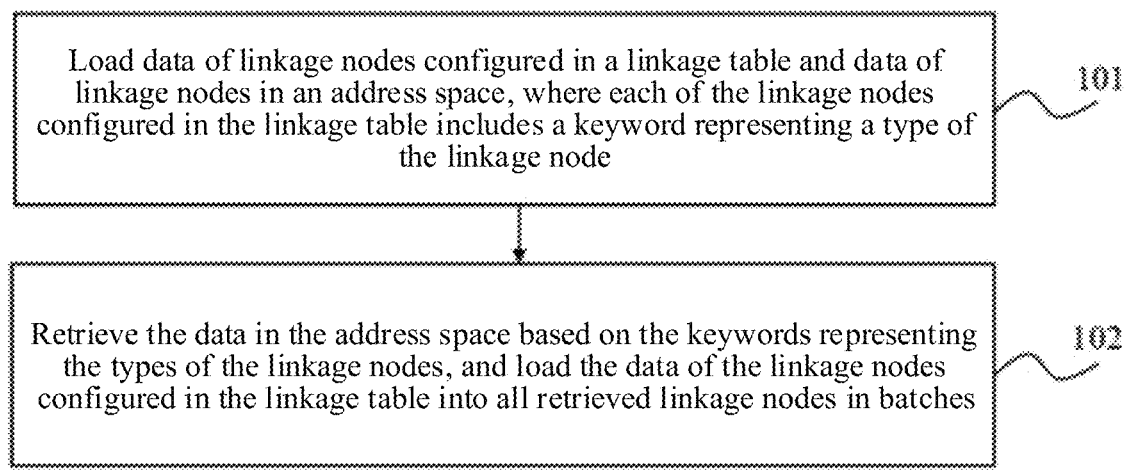
FIG. 3 is a flowchart of a method for batch configuration of linkages according to an implementation of the present disclosure.

An implementation of the present disclosure relates to a method for batch configuration of linkages, which is applicable to processes of integrating linkage data and transmitting data with a configuration terminal and an address space by a linkage server. A flowchart thereof is shown in FIG. 3, which includes the following steps.

Step 101: Data of linkage nodes configured in a linkage table and data of linkage nodes in an address space are loaded, where each of the linkage nodes configured in the linkage table includes a keyword representing a type of the linkage node.

In this implementation, the data of the linkage node includes basic linkage data and linkage action data. The basic linkage data includes a linkage attribute, a triggering factor, and a to-be-performed linkage action. The linkage action data includes an action script and an action attribute.

The linkage attribute includes relevant information of the linkage node. The triggering factor is configured for triggering the linkage action. The to-be-performed linkage action corresponds to the linkage action data. The action script is configured for executing the linkage action. The action attribute includes relevant information of the linkage action.

Figure 1:
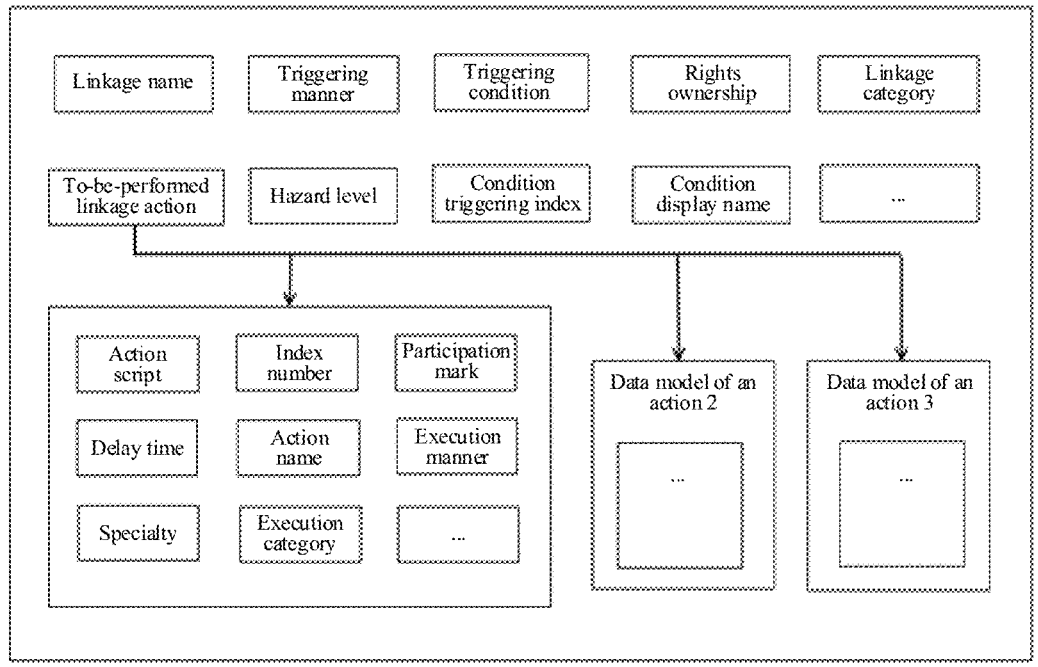
FIG. 1 is a schematic diagram of a model of a linkage instance according to an embodiment of the present disclosure.

For example, as shown in FIG. 1, the linkage attribute includes a linkage name, a linkage category, a hazard level, rights ownership, a condition triggering index, and a condition display name. The triggering factor includes a triggering manner and a triggering condition. The action attribute includes an index number, a participation mark, a delay time, an action name, an execution manner, a specialty, and an execution category. Certainly, the above are merely specific examples. During actual use, the data of the linkage nodes may further include other information or classification of different information may be adjusted for the data as required. Details are not enumerated herein.

In addition to being configured for configuring linkage-related functions, the above diversified linkage node data further facilitates sorting and classification, so that the data may be expressed more intuitively and clearly.

Triggering of a source field is used as an example. During configuration of the linkage nodes, a keyword representing a source trigger type is defined, and some keywords representing other types are defined to jointly limit the types of the linkage nodes. The defined keywords are configured for traversing the address space for all linkage nodes including the keywords when the linkage server retrieves the keywords of the types. The data of the linkage nodes is configured into all of the linkage nodes including the keywords in batches. It may be learned from the above example that, during configuration of the linkage data, a user only needs to configure data of one linkage node. Through this embodiment of the present disclosure, all linkage nodes of the same type may be configured, which implements batch configuration of the linkages, and reduces a work time.

Step 102: The data in the address space is retrieved based on the keywords representing the types of the linkage nodes, and the data of the linkage nodes configured in the linkage table is loaded into all retrieved linkage nodes in batches.

Specifically, there may be multiple keywords representing the types of the linkage nodes. During retrieval by the linkage server, all keywords representing the types of the linkage nodes are retrieved, and all linkage nodes including the keywords are found. The data of the linkage nodes in step 101 obtained from the data configuration terminal is loaded into all of the linkage nodes including the keywords, to implement batch configuration.

Figure 2:
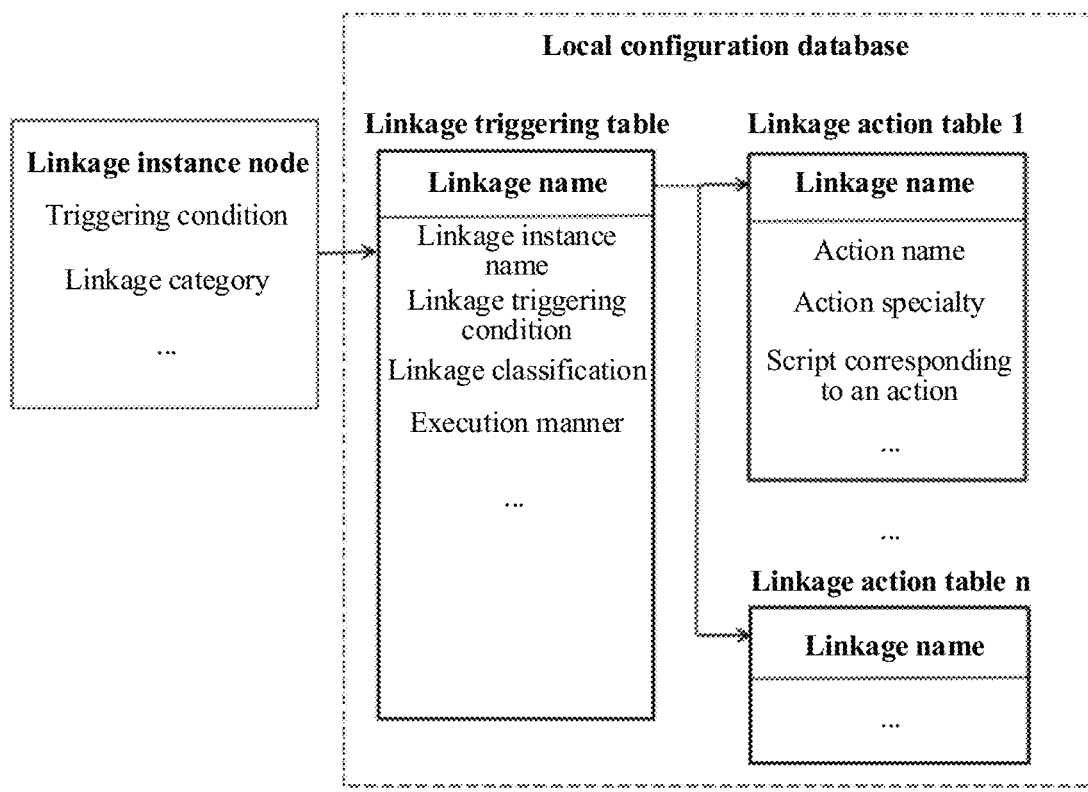
FIG. 2 is a schematic diagram of a linkage table according to an embodiment of the present disclosure.

In this implementation, the linkage table mainly includes linkage triggering tables and linkage action tables. As shown in FIG. 2, each linkage node corresponds to one of the linkage triggering tables. One linkage triggering table corresponds to multiple linkage action tables. The linkage triggering table includes a linkage name, a linkage instance name, a linkage triggering condition, a linkage category, and an execution manner. Each of the linkage action tables includes an action name, an action specialty, and a corresponding action script. Certainly, the above are merely specific examples. During actual use, the linkage table may further include other linkage-related data tables, and the data in the linkage table may further include other information actually required. Details are not enumerated herein. In addition to being configured for configuring linkage-related functions, the content of the linkage table displays linkage-related data more intuitively and clearly through a correspondence among the linkage triggering tables, the linkage action tables, and the linkage instances and various types of data therein.

Figure 4:
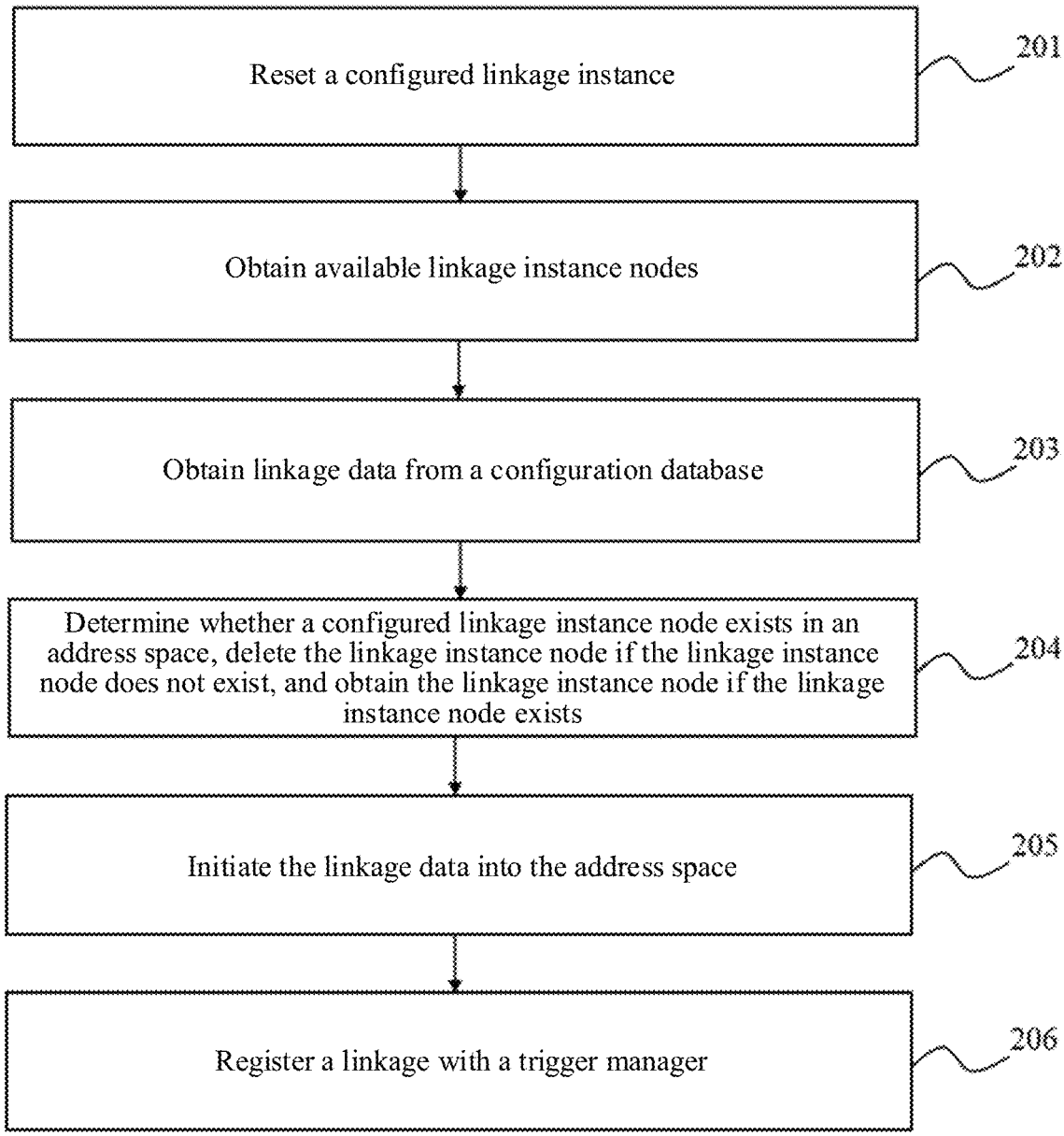
FIG. 4 is an initialization flowchart of a linkage server according to an implementation of the present disclosure shown in FIG. 3.

In this implementation, the steps performed by the linkage server actually constitute an initialization process, which is referred to as initialization of the linkage server. As shown in FIG. 4 the initialization process includes the following steps.

Step 201: A configured linkage instance is reset.

Specifically, during actual use, the linkage instance is often edited in configuration software and may have been put into use. Therefore, the configured linkage instance needs to be reset for reconfiguring the linkage data.

Step 202: Available linkage instance nodes are obtained.

Specifically, the linkage server obtains the available linkage instance nodes from the address space. The available linkage instance nodes are linkage instance nodes that exist in the address space. However, in this case, the linkage instance nodes are null values, and cannot function normally, and will be assigned with values in subsequent steps.

Step 203: Linkage data is obtained from a configuration database.

The configuration database belongs to the data configuration terminal. Specifically, the configuration database is configured in the form of a linkage table in this embodiment of the present disclosure, and the linkage data therein includes the linkage nodes and the data in the linkage nodes. In the obtained data of the linkage table, a same type of data includes only one piece of data, and the same type may include multiple types.

Step 204: It is determined whether a configured linkage instance node exists in the address space, the linkage instance node is deleted if the linkage instance node does not exist, and the linkage instance node is obtained if the linkage instance node exists.

Specifically, during actual use, the address space may have no linkage node corresponding to the linkage instance. In this case, the linkage node needs to be deleted, for correcting a misoperation performed by the user and improving usage efficiency of a storage space in a memory.

Step 205: The linkage data is initialized into the address space.

That the linkage data is initialized into the address space means that the linkage data is loaded into the address space. Specifically, this step includes step 102. The data obtained from the configuration database is configured through step 102 into the linkage nodes obtained in step 204, and then the configured linkage nodes are sent to the address space.

Step 206: A linkage is registered with a trigger manager.

Specifically, after the configured linkage nodes are sent to the address space, the configured linkage data cannot be formally executed. The linkage needs to be further registered with the trigger manager. After the registration is completed, the linkage may be formally executed. The user may control whether to register the linkage with the trigger manager. The trigger manager is connected with a comprehensive operation dispatching system and the terminal for performing the linkage action. Through the registration of the linkage with the trigger manager before the formal execution of the linkage, the comprehensive operation dispatching system may obtain the linkage data to facilitate management and maintenance of the linkage by a relevant person, and a security guarantee may be provided so that the configured linkage data does not take effect immediately, thereby preventing losses caused by a configuration error.

Compared to the related art, in the implementations of the present disclosure, the linkage server loads the data of the linkage nodes configured in the linkage table and the data of the linkage nodes in the address space, retrieves the data in the address space based on the keywords representing the types of the linkage nodes, and loads the data of the linkage nodes configured in the linkage table into all of the retrieved linkage nodes in batches, which implements batch configuration of linkage data, thereby resolving a problem of a heavy workload as a result of configuration of each single point of linkage data one by one in the related art.

Moreover, in the method for batch configuration of linkages provided in the implementations of the present disclosure, through batch configuration of the linkage data in the linkage table, a lot of configuration time is reduced, and time costs and a workload of a data person are reduced. In addition, in the method for batch configuration of linkages provided in the implementations of the present disclosure, the linkage table corresponds to the linkage nodes and includes the linkage triggering tables and the linkage action tables, one linkage triggering table corresponds to multiple linkage action tables, and the data configuration terminal displays the linkage table, so that relationships between multiple different linkages and between multiple different actions of the same linkage may be directly visible, which reduces a possibility of errors, facilitates subsequent maintenance and management, and facilitates reuse.

Figure 5:
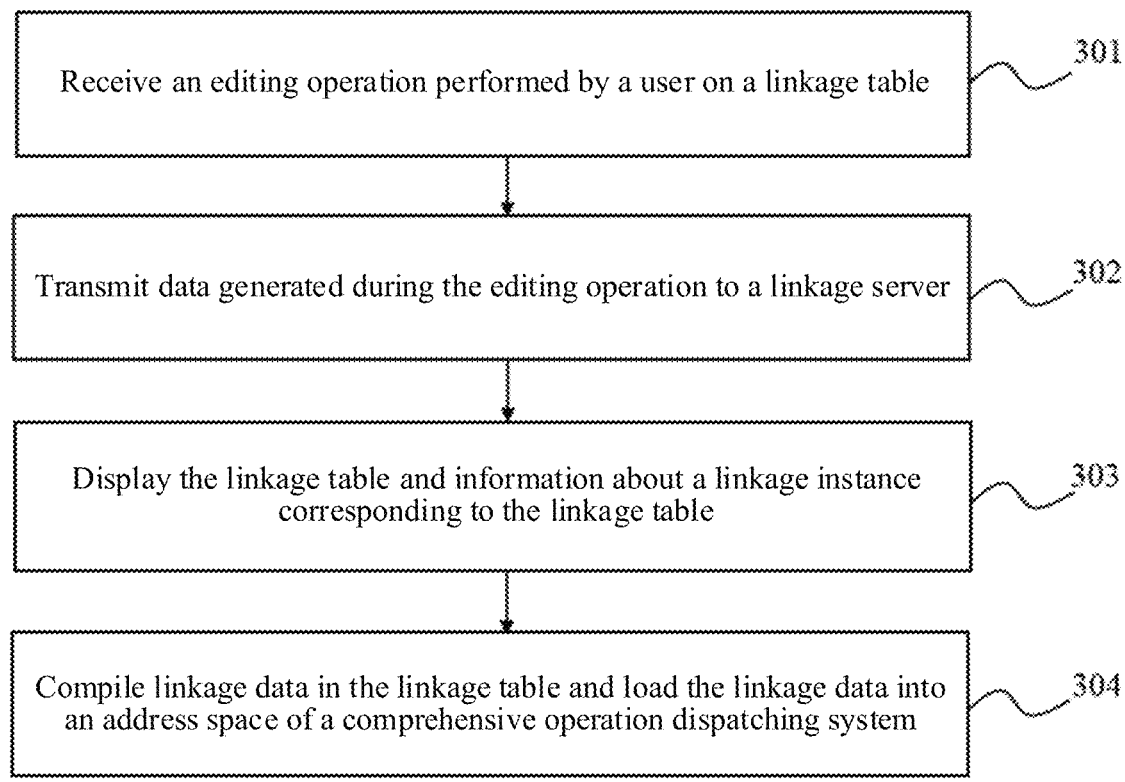
FIG. 5 is a flowchart of a method for batch configuration of linkages according to another implementation of the present disclosure.

Another implementation of the present disclosure relates to a method for batch configuration of linkages, which is applicable to processes of receiving editing performed by a user on a linkage table and sending configured linkage data to a linkage server and an address space. A flowchart thereof is shown in FIG. 5, which includes the following steps.

Step 301: An editing operation performed by a user on a linkage table is received, where the editing operation on the linkage table includes creating the linkage table, modifying the linkage table, and configuring linkage nodes and data in the linkage nodes in the linkage table.

Specifically, the editing operation on the linkage table is completed in a configuration tool. First, required linkage nodes are created through a model manager in the configuration tool. In this case, all data in the linkage nodes representing types is a null value, for example, is information such as a triggering condition and a linkage category. Then the linkage nodes are formed into a linkage table. If the linkage table exists, the linkage table does not need to be formed. The linkage table may be modified according to changes in the linkage nodes. Finally, data that needs to be configured is configured into the linkage nodes in the linkage table. In this case, only one piece of data needs to be configured for the linkage nodes of a same type, that is, the linkage nodes that may be configured together. The data may be configured into all of the linkage nodes that may be configured together in batches in the linkage server.

Step 302: Data generated during the editing operation is transmitted to the linkage server.

Specifically, the data generated during the editing operation includes the linkage nodes configured in the linkage table, the data in the linkage nodes, and data of a linkage instance corresponding to the linkage table. The data generated during the editing operation is transmitted to the linkage server, for the linkage server to register, in batches, the data of the linkage nodes with other linkage nodes that may be configured together, and register a linkage with a trigger manager.

Step 303: The linkage table and information about a linkage instance corresponding to the linkage table are displayed.

Specifically, the linkage table and the information the linkage instance corresponding to the linkage table are displayed through a display apparatus. The linkage table includes linkage triggering tables and linkage action tables, and the linkage table is further in a one-to-one correspondence with the corresponding linkage instance, so that the user may see multiple linkages and relationships between different actions of the same linkage more intuitively, which facilitates subsequent maintenance.

Step 304: Linkage data in the linkage table is compiled and loaded into an address space of a comprehensive operation dispatching system.

Specifically, the linkage data in the linkage table only includes fields such as a linkage name in the linkage nodes not assigned with a value, a linkage triggering manner, a linkage type, and a linkage action, and is configured for reading by the linkage server after being compiled and loaded into the address space.

Figure 6:
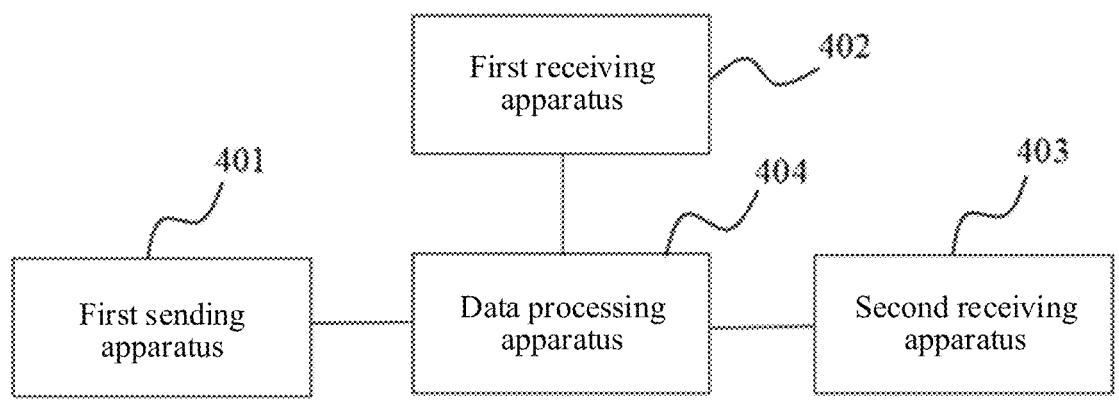
FIG. 6 is a schematic structural diagram of a terminal device according to still another implementation of the present disclosure.

Still another implementation of the present disclosure relates to a terminal device. As shown in FIG. 6, the terminal device includes a first sending apparatus 401, a first receiving apparatus 402, a second receiving apparatus 403, and a data processing apparatus 404.

The first sending apparatus 401 is configured to send configured linkage nodes and data in the linkage nodes to an address space.

The first receiving apparatus 402 is configured to receive linkage data in a data configuration terminal.

The second receiving apparatus 403 is configured to receive data of linkage nodes in the address space.

The data processing apparatus 404 is configured to: retrieve the data in the address space based on a keyword in each of the linkage nodes representing a type of the linkage node, and load the data of the linkage nodes into all retrieved linkage nodes in batches.

Figure 7:
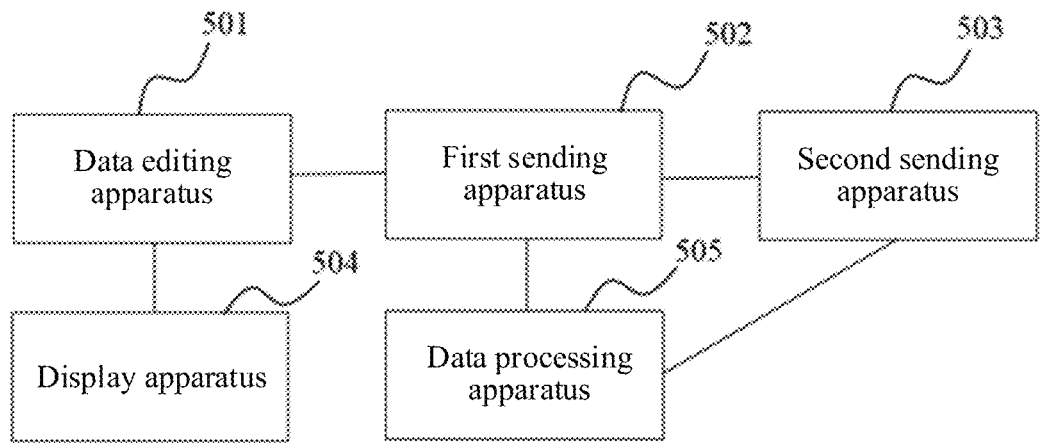
FIG. 7 is a schematic structural diagram of a terminal device according to yet another implementation of the present disclosure.

Yet another implementation of the present disclosure relates to a terminal device. As shown in FIG. 7, the terminal device includes a data editing apparatus 501, a first sending apparatus 502, a second sending apparatus 503, a display apparatus 504, and a data processing apparatus 505.

The data editing apparatus 501 is configured to receive an editing operation performed by a user on the linkage table. The editing operation on the linkage table includes creating the linkage table, modifying the linkage table, and configuring linkage nodes and data in the linkage nodes in the linkage table.

The first sending apparatus 502 is configured to send linkage nodes in the linkage table and data in the linkage nodes to a linkage server.

The second sending apparatus 503 is configured to send compiled data of the linkage nodes to an address space.

The display apparatus 504 is configured to display a linkage instance node and a linkage table.

The data processing apparatus 505 is configured to compile the data of the linkage nodes in the linkage table.

Figure 8:
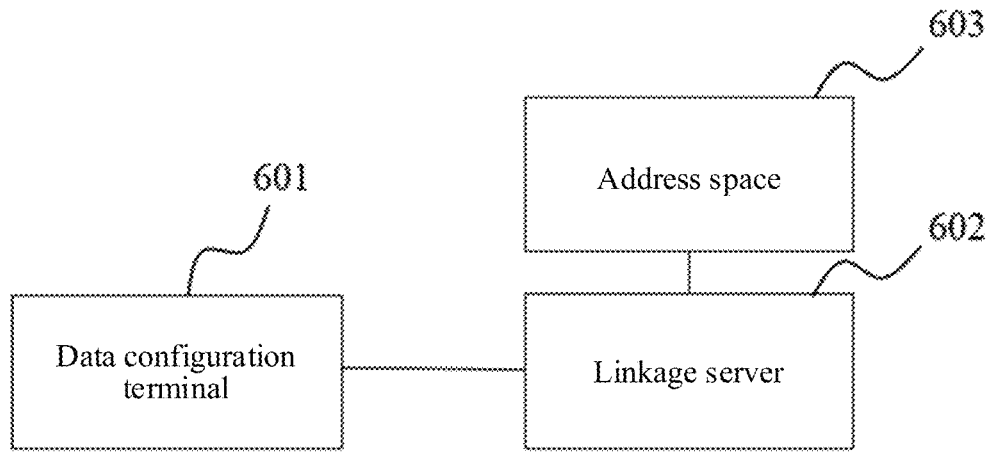
FIG. 8 is a schematic structural diagram of a system for batch configuration of linkages according to still yet another implementation of the present disclosure.

Still yet another implementation of the present disclosure relates to a system for batch configuration of linkages. As shown in FIG. 8, the system includes a data configuration terminal 601 and the linkage server 602.

The data configuration terminal 601 is configured to: receive an operation performed by a user on a linkage table, display linkage data, and send the linkage data to a linkage server.

The linkage server 602 is configured to: load data of linkage nodes configured in a linkage table and data of linkage nodes in an address space 603, retrieve the data in the address space based on a keyword in the linkage node representing a type of each of the linkage nodes, load the data of the linkage nodes into all retrieved linkage nodes in batches, and register a linkage with a trigger manager, the trigger manager being included in the linkage server.

Figure 9:
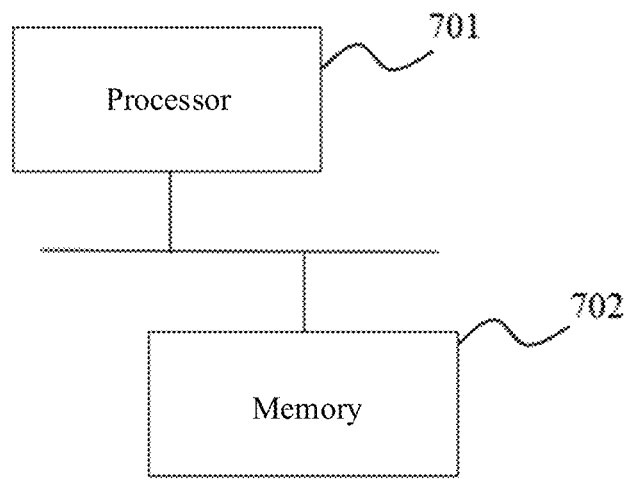
FIG. 9 is a schematic structural diagram of an electronic device according to a further implementation of the present disclosure.

A further implementation of the present disclosure relates to an electronic device. As shown in FIG. 9, the electronic device includes at least one processor 701 and a memory 702.

The memory 702 is communicatively connected to the at least one processor 701.

The memory 702 stores instructions executable by the at least one processor. The instructions, when executed by the at least one processor 701, cause the at least one processor 701 to perform the method for batch configuration of linkages in the first implementation to the third implementation of the present disclosure.

The processor and the memory are connected by a bus. The bus may include any number of interconnected buses and bridges. The bus connects together circuits of the one or more processors and the memory. The bus may further connect together multiple other circuits such as a peripheral device, a voltage regulator, and a power management circuit. This is well known in the art, and therefore is not further described herein. A bus interface provides an interface between the bus and a transceiver. The transceiver may be one element or multiple elements, such as multiple receivers and transmitters, which provides a unit configured to communicate with various other apparatuses on a transmission medium. Data processed by the processor is transmitted through a wired medium or through an antenna on a wireless medium. Further, the antenna further receives data and sends data to the processor.

The processor is responsible for managing the bus and general processing, and may further provide functions, including timing, a peripheral interface, voltage regulation, power management, and other control functions. However, the memory may be configured to store data used by the processor when performing an operation.

A fifth implementation of the present disclosure relates to a computer-readable storage medium, which stores a computer program. When the computer program is executed by the processor, the above method embodiments are implemented.

In other words, a person skilled in the art may understand that all or some of the steps for implementing the methods in the above embodiments may be completed by a program by instructing related hardware. The program is stored in a storage medium, and includes multiple instructions for causing a device (which may be a single-chip microcomputer, a chip, or the like) or a processor to perform all or some of the steps of the methods in the embodiments of the present disclosure. The storage medium includes any medium that may store program code, such as a USB flash drive, a removable hard disk, a read-only memory (ROM), a random access memory (RAM), a magnetic disk, or a compact disc.

A person skilled in the art should understand that the embodiments of the present disclosure may be provided as methods, apparatuses, or computer program products. Therefore, the embodiments of the present disclosure may use a form of hardware-only embodiments, software-only embodiments, or embodiments combining software and hardware. In addition, the embodiments of the present disclosure may use a form of a computer program product implemented on one or more computer-usable storage media (including but not limited to a disk memory, a CD-ROM, and an optical memory) including computer-usable program code.

The embodiments of the present disclosure are described with reference to flowcharts and/or block diagrams of the method, the terminal device (system), and the computer program product in the embodiments of the present disclosure. It should be understood that computer program instructions may implement each procedure and/or block in the flowcharts and/or block diagrams and a combination of procedures and/or blocks in the flowcharts and/or block diagrams. The computer program instructions may be provided for a general-purpose computer, a dedicated computer, an embedded processor, or a processor of another programmable data processing terminal device to produce a machine, so that the instructions executed by the computer or the processor of the another programmable data processing terminal device produce an apparatus for implementing a specified function in one or more processes in the flowcharts and/or in one or more blocks in the block diagrams.

The computer program instructions may alternatively be stored in a computer-readable memory that can instruct the computer or the another programmable data processing terminal device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded into the computer or the another programmable data processing terminal device, so that the computer or the another programmable terminal device performs a series of operations and steps to generate a computer-implemented process. In this way, the instructions executed on the computer or the another programmable terminal device provide steps for implementing a specific function in one or more processes in the flowcharts and/or in one or more blocks in the block diagrams.

Although the exemplary embodiments of the present disclosure have been described, a person skilled in the art may make additional changes and modifications to the embodiments once they know the basic creative concept. Therefore, the appended claims are intended to be interpreted as including the preferred embodiments and all changes and modifications falling within the scope of the embodiments of the present disclosure.

Finally, it should be further noted that, the relational terms herein such as first and second are merely configured for differentiating an entity or an operation from another entity or operation, and do not require or imply any actual relationship or sequence between these entities or operations. Furthermore, terms "comprise", "include" or any other variants are intended to encompass non-exclusive inclusion, such that a process, a method, an article, or a terminal device including a series of elements not only include those elements, but also includes other elements not listed explicitly or includes intrinsic elements for the process, the method, the article, or the terminal device. If no more limitations are made, an element limited by "include a/an . . . " does not exclude other same elements existing in the process, the method, the article, or the terminal device which includes the element.

A braking method, a braking system, and a vehicle provided in the present disclosure are described above in detail. Although the principles and the implementations of the present disclosure are described by using specific examples in this specification, the descriptions of the above embodiments are merely configured for helping understand the method of the present disclosure and the core idea of the method. Meanwhile, a person of ordinary skill in the art may make modifications to the specific implementations and application scope according to the idea of the present disclosure. In conclusion, the content of this specification should not be construed as a limitation on the present disclosure.

What is claimed is:

1. A method for batch configuration of linkages, applicable to a linkage configuration process in the field of rail transit, and comprising:
    loading data of linkage nodes configured in a linkage table and data of linkage nodes in an address space, wherein each of the linkage nodes configured in the linkage table comprises a keyword representing a type of the linkage node; and
    retrieving the data in the address space based on the keywords representing the types of the linkage nodes, and loading the data of the linkage nodes configured in the linkage table into all retrieved linkage nodes in batches.

2. The method according to claim 1, wherein the data of the linkage node comprises basic linkage data and linkage action data; the basic linkage data comprises a linkage attribute, a triggering factor, and a to-be-performed linkage action; the linkage action data comprises an action script and an action attribute;
    the linkage attribute comprises relevant information of the linkage node; the triggering factor is configured for triggering the linkage action; the to-be-performed linkage action corresponds to the linkage action data; and the action script is configured for executing the linkage action; and the action attribute comprises relevant information of the linkage action.

3. The method according to claim 1, wherein the linkage table comprises linkage triggering tables and linkage action tables; each linkage node corresponds to one of the linkage triggering tables; one linkage triggering table corresponds to a plurality of linkage action tables;
    the linkage triggering table comprises a linkage name, a linkage instance name, a linkage triggering condition, a linkage category, and an execution manner; and each of the linkage action tables comprises an action name, an action specialty, and a corresponding action script.

4. The method according to claim 2, wherein the linkage table comprises linkage triggering tables and linkage action tables; each linkage node corresponds to one of the linkage triggering tables; one linkage triggering table corresponds to a plurality of linkage action tables;
    the linkage triggering table comprises a linkage name, a linkage instance name, a linkage triggering condition, a linkage category, and an execution manner; and each of the linkage action tables comprises an action name, an action specialty, and a corresponding action script.

5. The method according to claim 1, wherein before the loading data of linkage nodes configured in a linkage table, the method further comprises:
    resetting a configured linkage instance;
    obtaining available linkage nodes from the address space;
    obtaining the linkage nodes from the linkage table; and
    comparing the linkage nodes obtained from the linkage table with the linkage nodes in the address space, deleting linkage nodes that do not exist in the address space, and obtaining linkage nodes that exist in the address space.

6. The method according to claim 2, wherein before the loading data of linkage nodes configured in a linkage table, the method further comprises:
    resetting a configured linkage instance;
    obtaining available linkage nodes from the address space;
    obtaining the linkage nodes from the linkage table; and
    comparing the linkage nodes obtained from the linkage table with the linkage nodes in the address space, deleting linkage nodes that do not exist in the address space, and obtaining linkage nodes that exist in the address space.

7. The method according to claim 3, wherein before the loading data of linkage nodes configured in a linkage table, the method further comprises:
    resetting a configured linkage instance;
    obtaining available linkage nodes from the address space;
    obtaining the linkage nodes from the linkage table; and
    comparing the linkage nodes obtained from the linkage table with the linkage nodes in the address space, deleting linkage nodes that do not exist in the address space, and obtaining linkage nodes that exist in the address space.

8. The method according to claim 4, wherein before the loading data of linkage nodes configured in a linkage table, the method further comprises:
    resetting a configured linkage instance;
    obtaining available linkage nodes from the address space;
    obtaining the linkage nodes from the linkage table; and
    comparing the linkage nodes obtained from the linkage table with the linkage nodes in the address space, deleting linkage nodes that do not exist in the address space, and obtaining linkage nodes that exist in the address space.

9. The method according to claim 1, wherein after the loading the data of the linkage nodes into all retrieved linkage nodes in batches, the method further comprises: registering a linkage with a trigger manager.

10. The method according to claim 2, wherein after the loading the data of the linkage nodes into all retrieved linkage nodes in batches, the method further comprises: registering a linkage with a trigger manager.

11. The method according to claim 3, wherein after the loading the data of the linkage nodes into all retrieved linkage nodes in batches, the method further comprises: registering a linkage with a trigger manager.

12. The method according to claim 4, wherein after the loading the data of the linkage nodes into all retrieved linkage nodes in batches, the method further comprises: registering a linkage with a trigger manager.

13. The method according to claim 5, wherein after the loading the data of the linkage nodes into all retrieved linkage nodes in batches, the method further comprises: registering a linkage with a trigger manager.

14. The method according to claim 6, wherein after the loading the data of the linkage nodes into all retrieved linkage nodes in batches, the method further comprises: registering a linkage with a trigger manager.

15. The method according to claim 7, wherein after the loading the data of the linkage nodes into all retrieved linkage nodes in batches, the method further comprises: registering a linkage with a trigger manager.

16. A method for batch configuration of linkages, applicable to a linkage configuration process in the field of rail transit, and comprising:
    receiving an editing operation performed by a user on a linkage table, wherein the editing operation on the linkage table comprises creating the linkage table, modifying the linkage table, and configuring linkage nodes and data in the linkage nodes in the linkage table;
    transmitting data generated during the editing operation to a linkage server;
    displaying the linkage table and information about a linkage instance corresponding to the linkage table; and
    compiling the linkage data in the linkage table and loading the linkage data into an address space of a comprehensive operation dispatching system.

17. The method according to claim 16, wherein after the linkage data in the linkage table is compiled and loaded into the address space of the comprehensive operation dispatching system, a linkage plug-in is loaded when a real-time database in the comprehensive operation dispatching system is enabled; and the linkage plug-in is initialized upon being loaded.

18. A system for batch configuration of linkages, comprising:
    a linkage server, the linkage server being applicable to a comprehensive operation dispatching system in the field of rail transit, and being configured to: load data of linkage nodes configured in a linkage table and data of linkage nodes in an address space, retrieve the data in the address space based on a keyword in the linkage node representing a type of each of the linkage nodes, load the data of the linkage nodes into all retrieved linkage nodes in batches, and register a linkage with a trigger manager, the trigger manager being comprised in the linkage server; and
    a data configuration terminal, applicable to a linkage configuration process in the field of rail transit, and being configured to: receive an operation performed by a user on the linkage table, display the linkage data, and send the linkage data to the linkage server.

19. An electronic device, comprising:
    at least one processor; and
    a memory, communicatively connected to the at least one processor, wherein
    the memory stores instructions executable by the at least one processor; and the instructions, when executed by the at least one processor, causes the at least one processor to perform the method for batch configuration of linkages according to claim 1.

20. A computer-readable storage medium, storing a computer program, the computer program, when executed by a processor, implementing the method for batch configuration of linkages according to claim 1.

* * * * *